United States Patent
Hayford et al.

(10) Patent No.: US 8,820,490 B2
(45) Date of Patent: Sep. 2, 2014

(54) MANUAL ADJUSTER FOR AUTOMATIC SLACK ADJUSTER

(75) Inventors: Roy L. Hayford, Canton, MI (US); Joseph A. Kay, Highland, MI (US); Kurt Heydenburg, Howell, MI (US); Pradeep D. Mirji, Karnataka (IN); Vishwanath Ramachandra, Karnataka (IN)

(73) Assignee: ArvinMeritor Technology, LLC, Troy, MI (US)

( * ) Notice: Subject to any disclaimer, the term of this patent is extended or adjusted under 35 U.S.C. 154(b) by 147 days.

(21) Appl. No.: 13/422,188

(22) Filed: Mar. 16, 2012

(65) Prior Publication Data

US 2013/0240307 A1  Sep. 19, 2013

(51) Int. Cl.
*F16D 65/14* (2006.01)

(52) U.S. Cl.
USPC ............................ 188/196 C; 188/196 BA

(58) Field of Classification Search
CPC ......... F16D 65/60; F16D 66/02; F16D 66/00; F16D 65/543; B60T 7/04
USPC ............ 188/1.11 R, 1.11 W, 196 R, 196 C, 188/196 BA
See application file for complete search history.

(56) References Cited

U.S. PATENT DOCUMENTS

| | | | |
|---|---|---|---|
| 2,922,317 A | 1/1960 | House | |
| 3,154,178 A | 10/1964 | House | |
| 4,384,638 A * | 5/1983 | Crissy et al. | 188/79.55 |
| 4,446,949 A | 5/1984 | Weber | |
| 4,478,316 A | 10/1984 | Davidson | |
| 4,478,317 A | 10/1984 | Sheill | |
| 4,499,976 A | 2/1985 | Weber | |
| 4,926,980 A * | 5/1990 | Cumming | 188/79.55 |
| 5,927,445 A | 7/1999 | Bieker et al. | |
| 5,992,579 A | 11/1999 | Kyrtsos | |
| 6,119,822 A | 9/2000 | Baldwin | |
| 6,213,264 B1 | 4/2001 | Walker et al. | |
| 6,397,977 B1 | 6/2002 | Ward | |
| 6,481,542 B2 | 11/2002 | Giering et al. | |
| 6,896,106 B2 | 5/2005 | Kramer | |
| RE38,874 E | 11/2005 | Bieker et al. | |
| 7,032,722 B2 | 4/2006 | Kramer et al. | |
| 7,055,658 B2 | 6/2006 | Jelley et al. | |
| 7,124,862 B2 | 10/2006 | Hayford et al. | |
| 7,246,690 B2 | 7/2007 | McCann | |
| 7,931,129 B2 | 4/2011 | Norman et al. | |
| 8,016,082 B2 | 9/2011 | Niehorster et al. | |

(Continued)

OTHER PUBLICATIONS

Meritor Maintenance Manual 4—Cam Brakes and Automatic Slack Adjusters. Revised Mar. 2011.

(Continued)

*Primary Examiner* — Vishal Sahni

(74) *Attorney, Agent, or Firm* — Brooks Kushman P.C.

(57) ABSTRACT

A slack adjuster comprises a worm shaft that is configured to drive a worm gear adapted for coupling to a camshaft. An adjustment assembly receives slack adjustment input from a push rod and is configured to automatically rotate the worm shaft when brake slack exceeds a predetermined limit. The slack adjuster includes a manual adjuster that is moveable between a non-adjustment position where the manual adjuster is de-coupled from the worm shaft and a manual adjustment position where the manual adjuster is coupled to the worm shaft such that a position of the worm shaft can be manually adjusted as needed.

17 Claims, 7 Drawing Sheets

(56) References Cited

U.S. PATENT DOCUMENTS

| | | |
|---|---|---|
| 2004/0026193 A1 | 2/2004 | Philpott |
| 2005/0039988 A1 | 2/2005 | Philpott |
| 2005/0067234 A1* | 3/2005 | Hayford et al. ........ 188/196 BA |
| 2005/0145449 A1 | 7/2005 | Jelley et al. |
| 2006/0163014 A1* | 7/2006 | Crewson ................ 188/196 BA |
| 2007/0012529 A1* | 1/2007 | Kreidler et al. ........... 188/196 R |
| 2007/0045065 A1* | 3/2007 | Plantan et al. ......... 188/196 BA |
| 2007/0256901 A1 | 11/2007 | Niehorster et al. |
| 2011/0073422 A1* | 3/2011 | Li .......................... 188/196 BA |

OTHER PUBLICATIONS

MEI Automatic Slack Adjuster-Fitting Instructions. Creation date: Jul. 13, 2009.

Gunite Automatic Slack Adjusters, Service Manual, Rev. 3. Jun. 2010.

Bendix Service Data—Bendix Manual Slack Adjusters. SD-05-12000. Mar. 2007.

Bendix ASA-5 Automatic Slack Adjuster (as found at http://www.foundationbrakes.com/en/products/slackadjusters). Jan. 2008.

* cited by examiner

MANUAL ADJUSTER FOR AUTOMATIC SLACK ADJUSTER

TECHNICAL FIELD

The subject invention relates to an automatic slack adjuster that includes a simplified mechanism for manual adjustment.

BACKGROUND OF THE INVENTION

An automatic slack adjuster is used to adjust a brake assembly as brake linings wear. The automatic slack adjuster adjusts the amount of slack, or "free play," in the brake to ensure that an associated air brake chamber can produce enough actuation force. With too little slack, the brake may drag and overheat, and if there is too much slack, the brake may not be capable of generating enough braking effort to stop the vehicle.

Certain slack adjusters require multiple tools in order to manually adjust a gear set of the slack adjuster. This is disadvantageous from a cost and labor perspective. Other slack adjusters may only require one tool for manual adjustment; however, with these adjusters, internal components must be overridden during adjustment. This requires additional torque in order to make the adjustment, which is also disadvantageous. Further, in some cases, the manual adjustment will slip a clutch or skip ratchet teeth, which can cause wear and damage thereby reducing the life of the slack adjuster.

SUMMARY OF THE INVENTION

A slack adjuster provides automatic slack adjustment during normal braking operations by adjusting a worm shaft via an adjustment assembly and provides manual slack adjustment by utilizing a manual adjuster that is selectively coupled to the worm shaft. Movement of the manual adjuster to a manual adjustment position also disengages automatic slack adjustment provided by the adjustment assembly.

In one example, the slack adjuster comprises a worm shaft that is configured to drive a worm gear adapted for coupling to a camshaft. An adjustment assembly receives slack adjustment input from a push rod and is configured to automatically rotate the worm shaft when brake slack exceeds a predetermined limit. The slack adjuster includes a manual adjuster comprising an end cover that is moveable between a non-adjustment position where the end cover is de-coupled from the worm shaft and a manual adjustment position where the end cover is coupled to the worm shaft such that a position of the worm shaft can be manually adjusted as needed.

In one example, the worm shaft and adjustment assembly are mounted within a blind-bore formed within a housing. The end cover is positioned within the bore to cover an open end of the bore.

In one example, the adjustment assembly comprises a control disc that is fixed for rotation with the worm shaft and an actuator disc that is coupled to the push rod. The control disc includes a plurality of control teeth and the actuator disc includes a plurality of actuator teeth that are in engagement with the control teeth. During a brake apply stroke, the push rod rotates the actuator disc such that the actuator teeth skip over the control teeth when slack exceeds the predetermined limit. Slack adjustment is automatically provided on a brake return stroke as the actuator teeth drive the control teeth causing the worm shaft to rotate.

In one example, the end cover comprises a hub portion facing the worm shaft and an extension portion that extends outwardly of a housing that encloses the worm shaft. The hub portion includes an internal bore having a splined surface configured to be coupled to a splined end of the worm shaft when the end cover is moved into the manual adjustment position.

These and other features of the present invention can be best understood from the following specification and drawings, the following of which is a brief description.

DETAILED DESCRIPTION OF A PREFERRED EMBODIMENT

Figure 1:
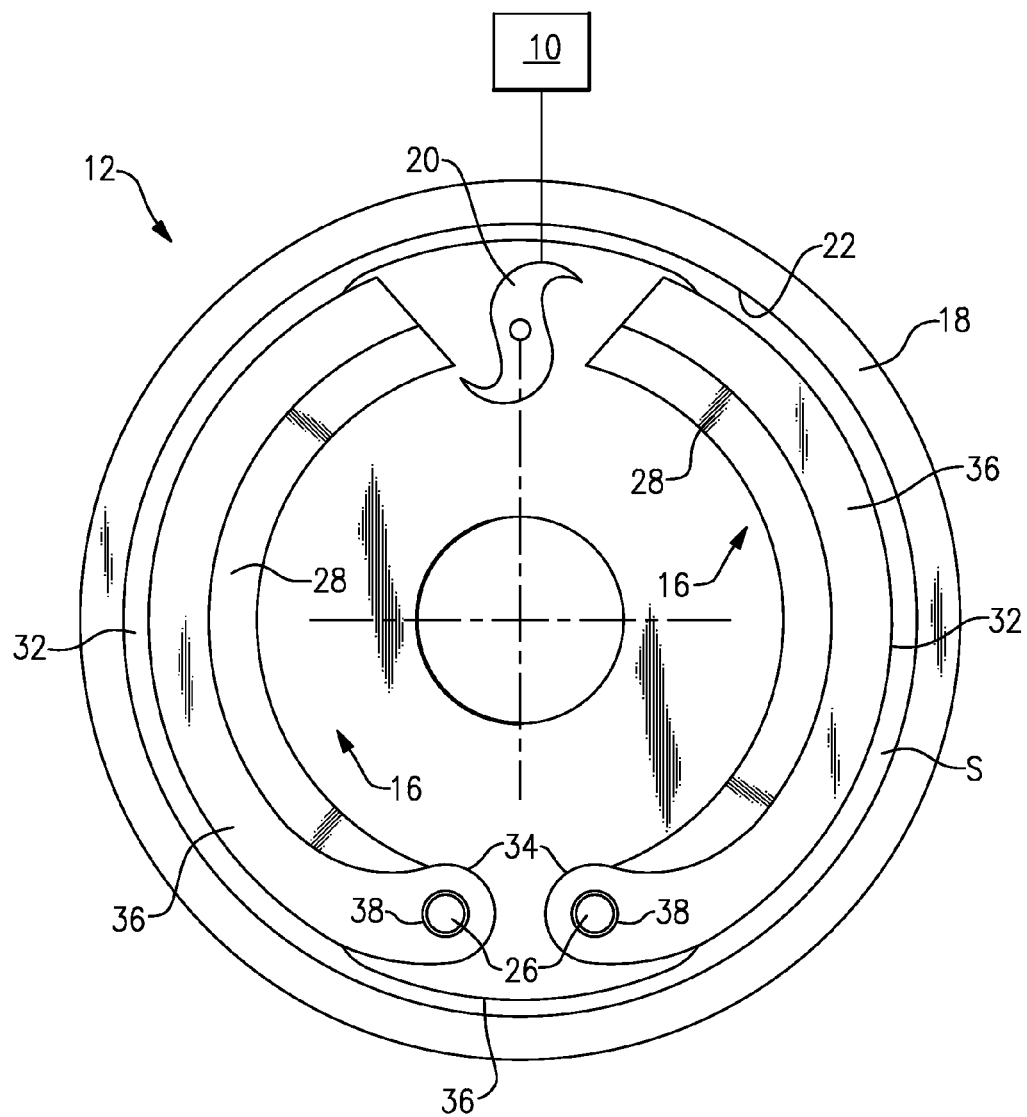
FIG. 1 is a schematic representation of a cam brake assembly.
Figure 2:
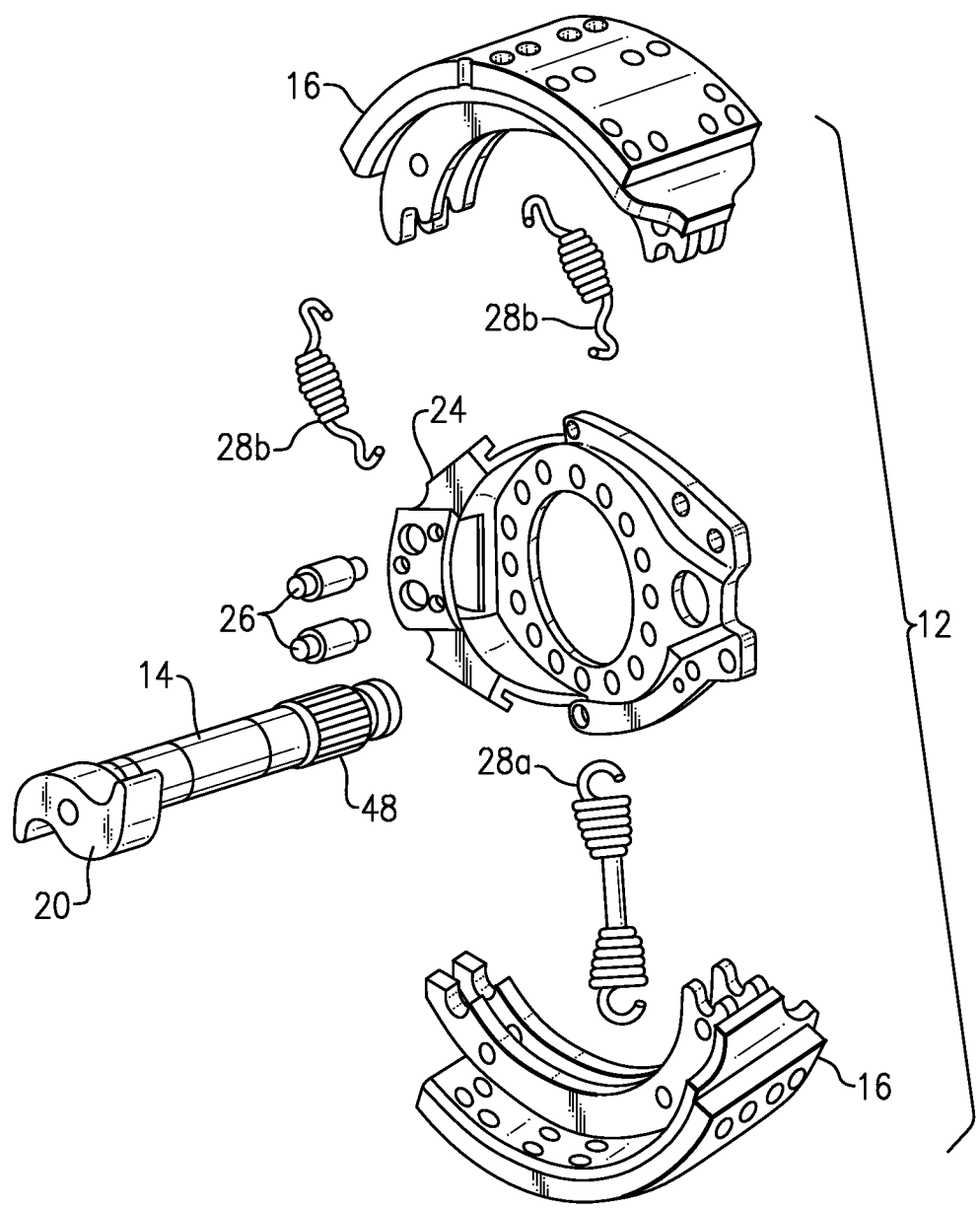
FIG. 2 is an exploded view of a cam brake assembly such as that depicted in FIG. 1.

As shown in FIGS. 1 and 2, a brake actuation system 10 is used to actuate a vehicle wheel brake 12 in response to a brake request. In one example, the wheel brake 12 comprises a cam brake with a camshaft 14 that is configured to press a pair of brake shoes 16 into engagement with a brake drum 18 configured to rotate with a vehicle wheel. The camshaft 14 includes an S-shaped cam 20 at one end that, upon rotation, is configured to pivot the brake shoes 16 outwardly into engagement with an inner braking surface 22 of the drum 18.

The brake shoes 16 are coupled to a brake spider 24 via anchor pins 26. The brake spider 24 is configured to be mounted to an axle housing or non-rotating wheel end component. A return spring 28a facilitates returning the brake shoes 16 to the non-applied position upon completion of a braking request. Shoe retaining springs 28b couple the brake shoes together adjacent the anchor pins 26.

Figure 3:
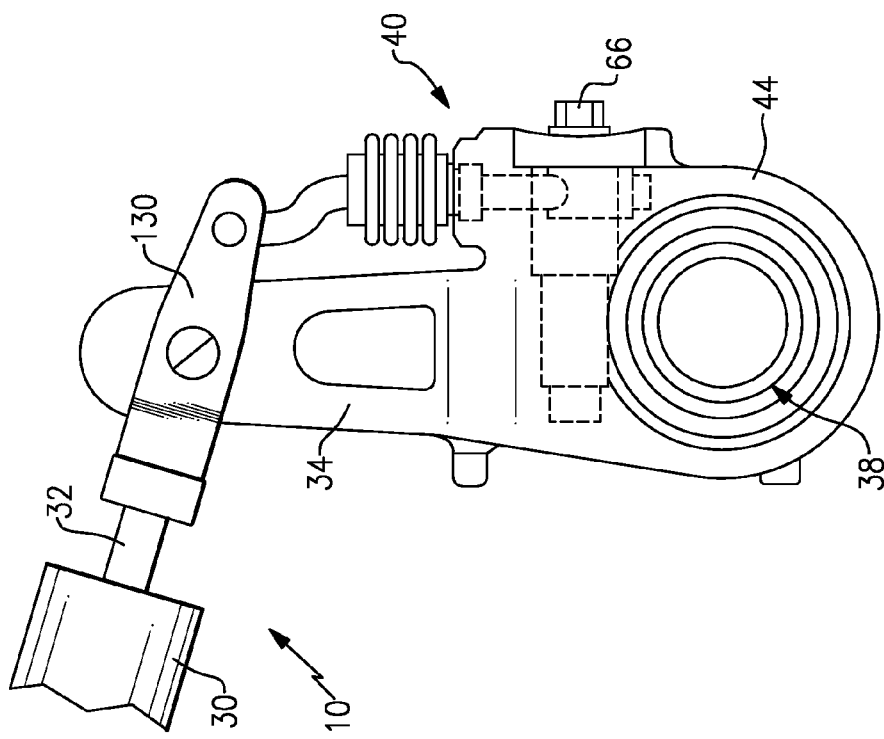
FIG. 3 is a side view of a slack adjuster in an assembled condition.
Figure 4:
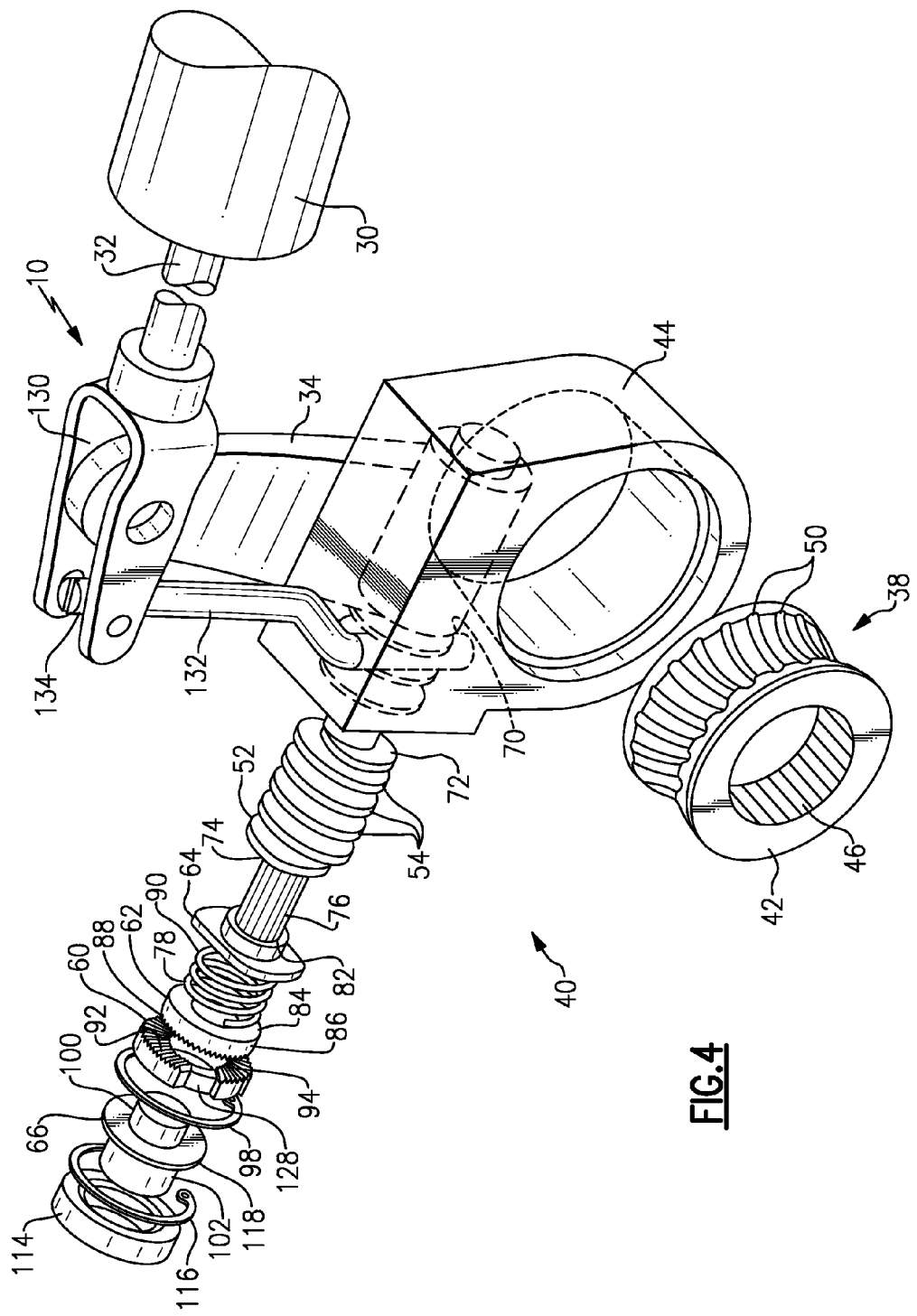
FIG. 4 is an exploded view of the slack adjuster of FIG. 3.

As shown in FIG. 3, the actuation system 10 includes a pressure input member, such as a brake air chamber 30 for example, which has an actuating rod 32 that is coupled to a brake actuation lever 34. Pressure operating on a diaphragm within the brake chamber 30 in response to a brake request, such as that initiated by depression of a brake foot pedal, forces the actuating rod 32 outwardly, which in turn rotates the actuation lever 34. The lever 34 extends in a generally vertical direction and is coupled to the camshaft 14, which rotates the cam 20 to press the brake shoes 16 outwardly into engagement with the brake drum 18 to stop the vehicle.

When the brake pedal is released, air pressure is exhausted from the brake chamber 30 and a spring or other return mechanism is configured to return the actuating rod 32 and lever 34 to a retracted, brake-off position. This also causes the brake shoes 16 to return to a non-applied position. In this non-applied position, there is a clearance space S, i.e. slack, between brake friction linings 36 on the brake shoes 16 and the engagement surface 22 on the brake drum 18. Over time, the thickness of the brake friction linings 36 decreases or wears, which in turn increases the slack. If slack becomes excessive, it may not be possible to provide a sufficient braking force to the drum 18, i.e. the actuating rod 32 may not be able to rotate the lever 34 far enough to exert a sufficient braking force against the drum 18.

To ensure that the actuation lever 34 is rotated to produce a desired amount of brake force, the lever 34 is coupled to a coupling member 38, which can be adjusted throughout the life of the brake shoes to ensure that the cam 20 is properly positioned in relation to the brake shoes to provide the desired braking force. An automatic slack adjuster mechanism 40 is used to automatically readjust the coupling member as the brake linings wear.

When an automatic slack adjuster mechanism 40 is installed, a brake chamber stroke measurement is set, which corresponds to the desired or correct shoe-to-drum clearance. As the brake linings 36 wear, this clearance, i.e. slack, increases and the brake chamber actuating rod 32 must travel farther to apply the brakes. Once this clearance or "slack" is increased beyond a predetermined limit, the slack adjuster is configured to automatically adjust during the return stroke to maintain the correct shoe-to-drum clearance. If the air brake chamber push rod stroke is within acceptable limits during operation, no adjustment occurs.

In the example shown in FIGS. 4-6B, the coupling member 38 comprises a worm gear 42 positioned within a housing 44. The worm gear 42 includes a splined inner opening 46 that is attached to a splined end 48 of the camshaft 14 (FIG. 2) that is opposite of the cam 20. A first set of worm teeth 50 are formed about an outer circumference of the worm gear 42.

The slack adjuster mechanism 40 includes a worm shaft 52, which has a second set of worm teeth 54 that are directly engaged with the first set of worm teeth 50. The worm shaft 52 is positioned within the housing 44 such that the worm shaft 52 is extending in a generally horizontal direction relative to the lever 34. In other words, the worm shaft 52 extends transversely relative to the lever 34, as opposed to extending generally parallel to the lever 34.

Figure 5:
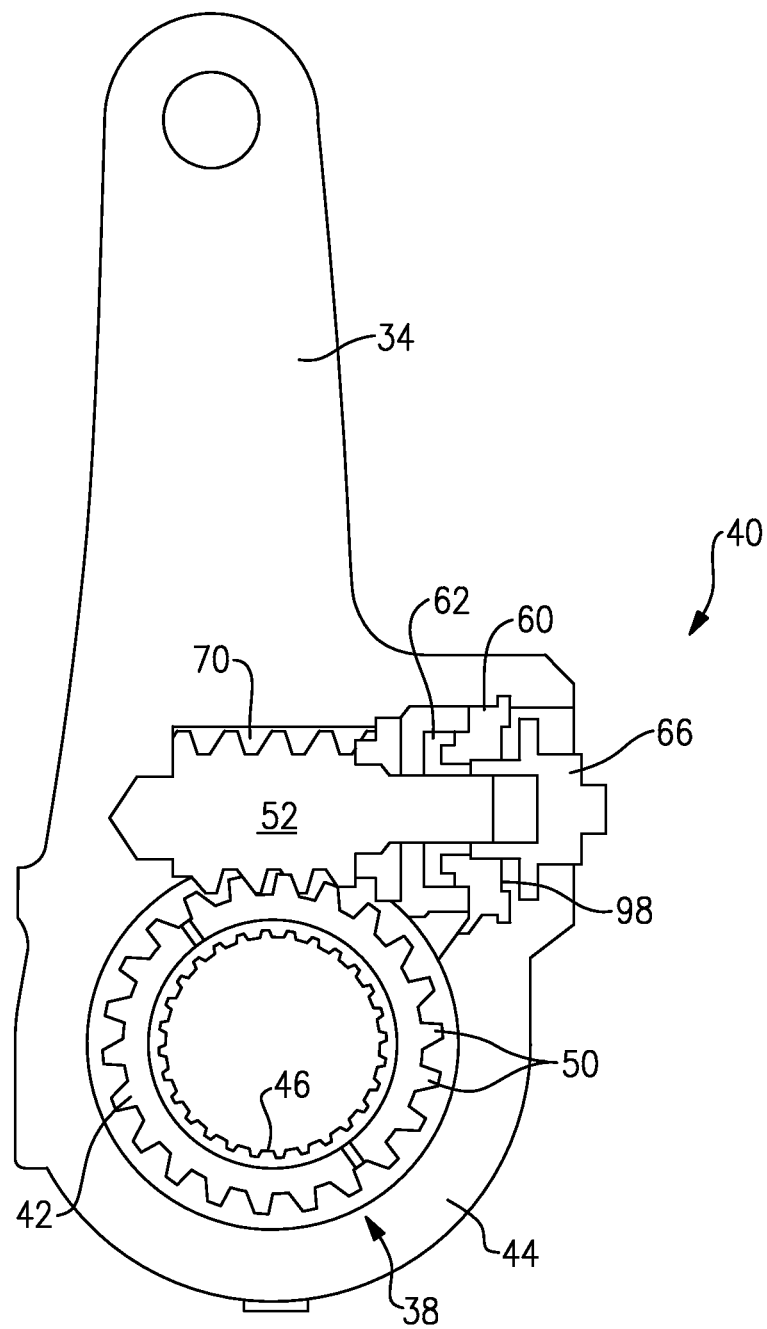
FIG. 5 is a cross-sectional view of the slack adjuster of FIG. 3.

The slack adjuster mechanism 40 further includes an actuator disc 60, a control disc 62, a bushing 64, and an end cover 66. The housing 44 includes a blind-bore or blind-hole 70, i.e. a hole having only one open end, which receives these components, as well as the worm shaft 52, as a sub-assembly. The blind-hole 70 is solely formed by a machining operation from one side of the housing 44 such that the hole 70 does not extend entirely through the housing 44 as shown in FIG. 5. This provides a fully enclosed end within the housing itself, and eliminates any cap, plug, or cover that is typically required to seal off an open end to protect the internal components from contaminants.

Figure 6A:
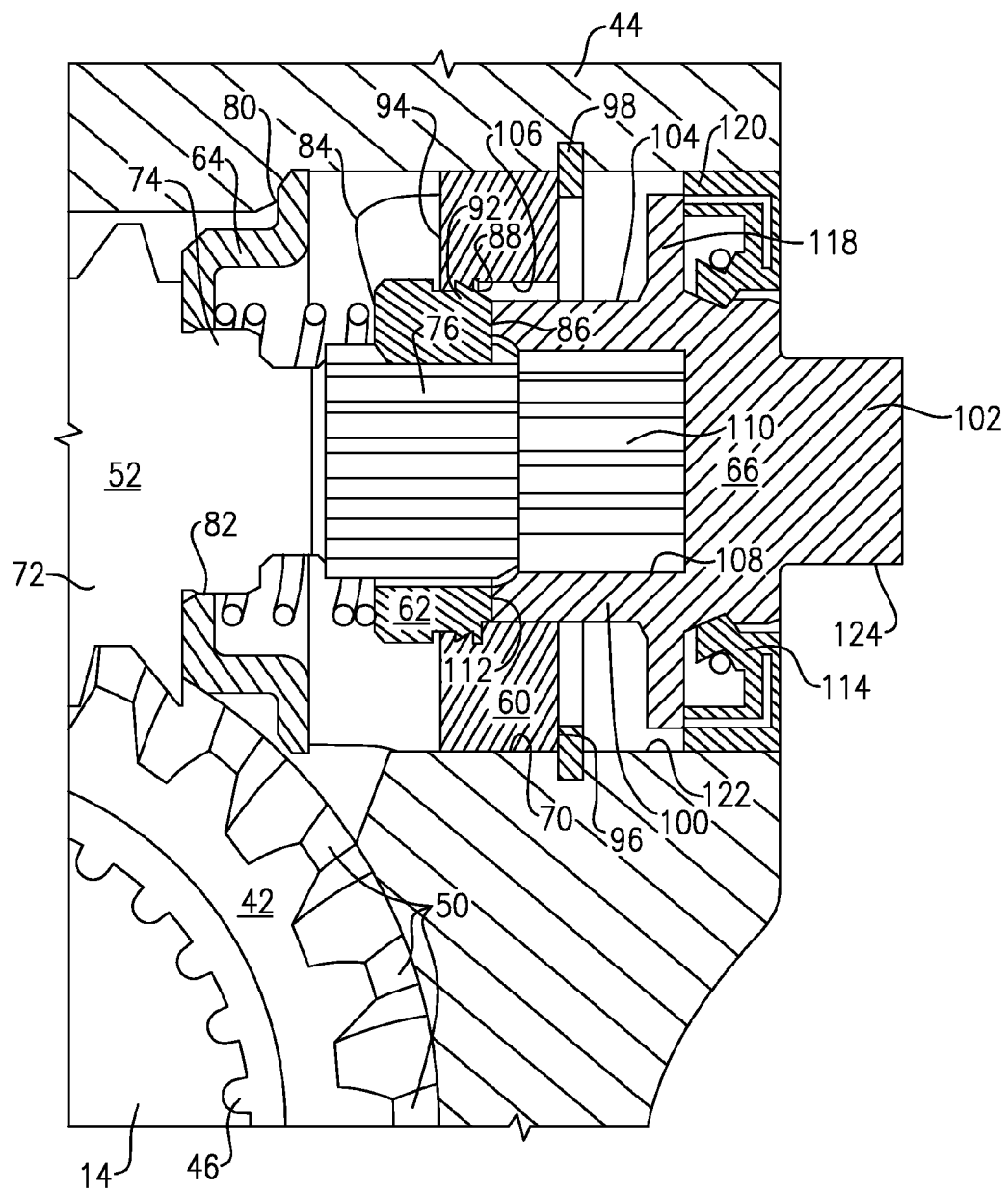
FIG. 6A is a magnified view of FIG. 5 showing a manual adjuster in a non-adjusting position.

The worm shaft 52 includes a gear portion 72 that includes the second set of worm teeth 54, a reduced neck portion 74 that supports the bushing 64, and a splined shaft portion 76 that is coupled to the control disc 62 via a mating splined bore 78 formed within the control disc 62. As shown in FIG. 6A, one end face of the bushing 64 engages an end face on the worm shaft between the neck portion 74 and gear portion 72. An opposite end face of the bushing 64 engages a shoulder 80 formed within the housing 44. The bushing 64 includes a bore 82 that rotatably supports the worm shaft 52 at the neck portion 74.

The control disc 62 includes a first end face 84 that faces the bushing 64 and a second end face 86 that faces the end cover 66. The control disc 62 includes a plurality of control teeth 88 on the second end face 86. A resilient member 90, such as a coil spring for example, has one spring end in engagement with the first end face 84 and a second spring end in engagement with the bushing 64. The resilient member 90 loads the control teeth 88 into engagement with actuator teeth 92 on the actuator disc 60. As such, the actuator 60 and control 62 discs are always in contact with each other. In one rotational direction, i.e. a brake apply direction, the actuator teeth 92 skip past the control teeth 88. In an opposite rotational direction, i.e. a brake return direction, the actuator teeth 92 drive against the control teeth 88, causing the control disc 62 to rotate, and hence the worm shaft 52 to rotate.

The actuator teeth 92 are formed on a first end 94 of the actuator disc 60, which faces the control disc 62. A second end 96 of the actuator disc 60 faces the end cover 66. The actuator disc 60 has an outer circumference that is close to the diameter of the blind-hole 70 such that the actuator disc 60 sits within the blind-hole in a light press-fit or slightly loose fit. A snap ring 98 is installed within the blind-hole to hold the actuator disc 60 at a desired axial location.

The end cover 66 includes a hub portion 100 at one end and a knob portion 102 that extends outwardly of the housing 44 at an opposite end. The hub portion 100 includes an outer surface 104 that has a slightly smaller diameter than an inner diameter of a center bore 106 of the actuator disc 60. This allows the hub portion 100 to be inserted into the center bore 106 without contacting the actuator disc 60. The hub portion 100 includes a blind-bore 108 that has a splined inner circumferential surface 110. An end face 112 of the hub portion 100 abuts against the control disc 62.

A seal 114 holds the end cover 66 within the bore 70. An optional snap ring 116 (FIG. 4) could also be used to provide additional securement for the end cover 66. The seal 114 abuts against a flange portion 118 of the end cover 66. The flange portion 118 is generally centrally located on the end cover and is defined by a diameter that is larger than the hub 100 and knob 102 portions. An outer surface 120 of the seal 114 sealing engages a surface 122 that defines the bore 70.

The knob portion 102 extends outwardly of the housing 44. In one example, the knob portion 102 is configured to provide a grasping surface and/or a tool engagement surface 124 to provide a manual adjustment feature. This will be discussed in greater detail below.

Figure 7:
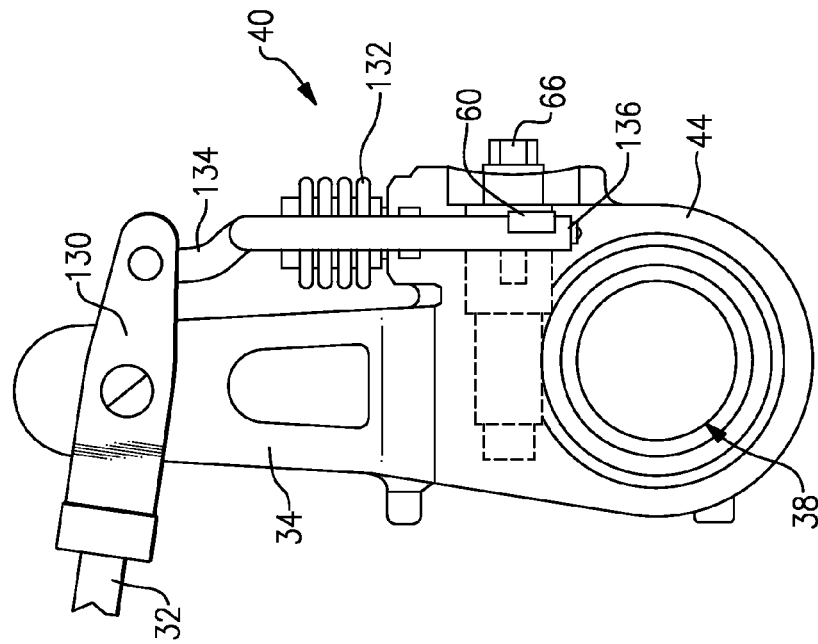
FIG. 7 is a figure similar to FIG. 3 but shows a cross-section at a connection between an actuator disc and push rod.

The housing 44 (FIGS. 3-4) includes a clevis attachment 130 that is coupled to the push rod 32 of the air chamber 30 in a known manner. A push rod 132 (FIG. 4) has a first end 134 coupled to the clevis attachment 130 in a known manner and a second end 136 that is in engagement with the actuator disc 60 as shown in FIG. 7. In the example shown, the actuator disc 60 includes a pair of grooves 128 (FIG. 4) formed in an outer surface on one side of the actuator disc 60. A mating portion of the push rod 132, adjacent the second end 136, cooperates with these grooves 128 such that the push rod 132 and actuator disc 60 are always in contact. The housing 44 includes an opening on an upper surface that extends into the blind bore to allow the push rod 132 to engage the actuator disc 60.

The slack adjuster mechanism 40 operates in the following manner. A brake request is initiated, for example, by pressing a brake pedal. In the brake apply direction, if there is significant lining wear, i.e. lining wear has exceed a predetermined limit, the push rod 132 is lifted and rotates the actuator disc 60 such that the actuator teeth 92 skip past the control teeth 88 at least one increment, i.e. at least one tooth increment. The adjustment is made on the brake return stroke as the actuator teeth 92 and control teeth 88 are in driving engagement upon opposite rotation, i.e. the actuator 60 and control 62 discs are locked together on the return stroke. This causes the worm shaft 52 to provide incremental adjustment by rotating the worm gear 42, which in turn rotates the camshaft 14 to adjust the position of the cam 20.

The slack adjustment mechanism 40 can also be manually adjusted as needed. In a normal, non-adjustment position (FIG. 6A), the seal 114 holds the end cover 66 in place so that the end cover cannot fall out of the hole 70. The splined inner circumferential surface 110 of the bore 108 is axially spaced from the splined shaft portion 76 of the worm shaft 52. In this position the end cover 66 can rotate freely within the hole 70.

Figure 6B:
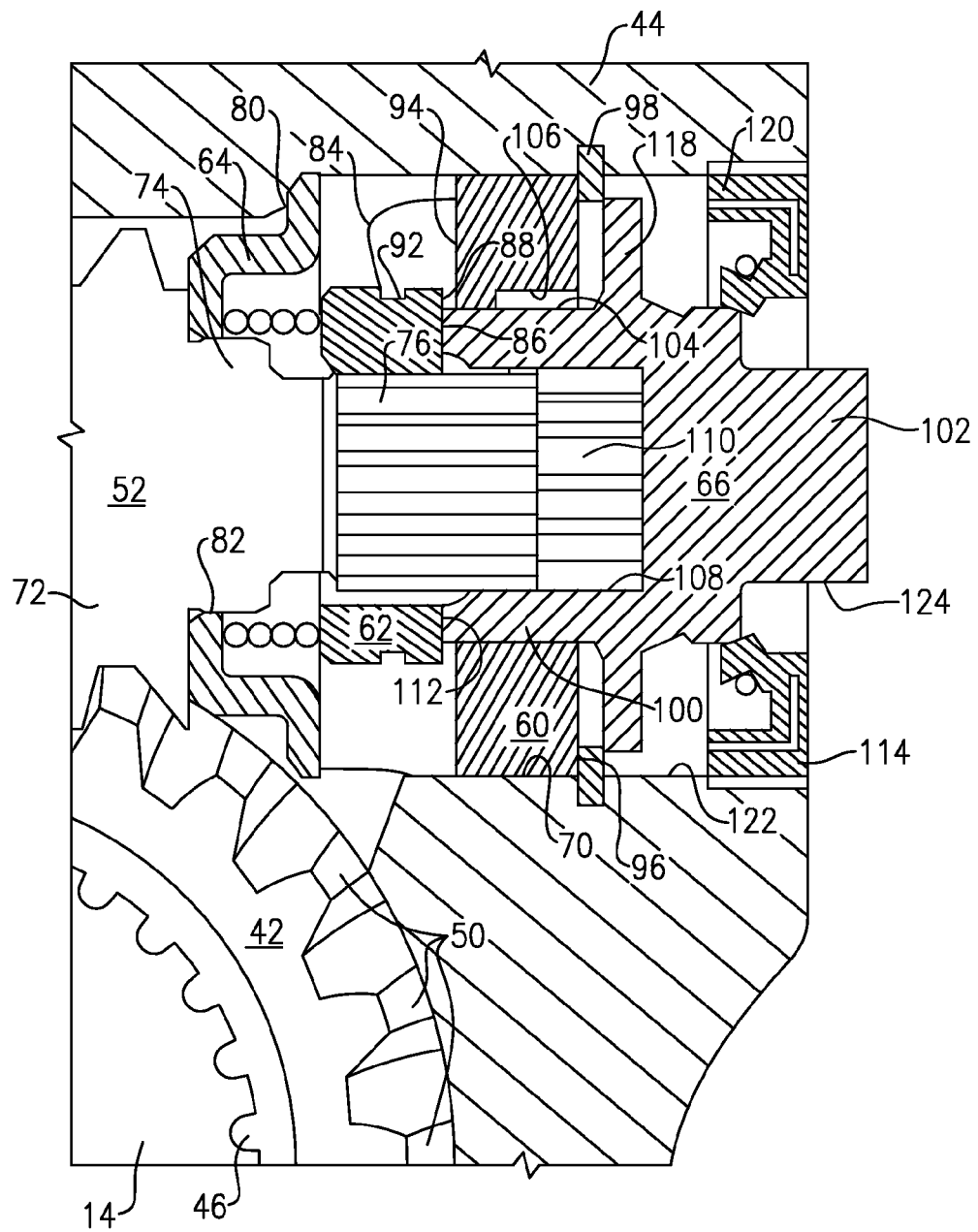
FIG. 6B is a magnified view of FIG. 5 showing the manual adjuster in an adjusting position.

To manually adjust the worm gear, the end cover 66 is pressed axially inward in a direction toward the worm shaft 52. This movement results in two simultaneous actions. First, the control disc 62 is disengaged from the actuator disc 60. Second, the splined inner circumferential surface 110 of the end cover 66 is slid into engagement with the splined shaft portion 76 of the worm shaft 52, as shown in FIG. 6B. Rotation of the end cover 66 in this position results in rotation of the worm shaft 52 to adjust slack by rotating the worm gear 42 and camshaft 14. To rotate the end cover 66, the knob portion 102 is rotated by using a tool, for example.

This manual adjustment configuration is advantageous for several reasons. The end cover 66 serves to seal the open end of the blind-hole 70 to prevent contaminants from adversely affecting the internal components. Also, a single tool can be used to provide the adjustment. Finally, the end cover does not interface with other components during non-manual adjustment operations. As such, the torque required to adjust the slack is low. Also, there is no wear or damage to adjuster components during manual adjustment because the end cover has disengaged the automatic adjustment system, i.e. the control disc 62 is disengaged from the actuator disc 60.

Another advantage with the subject slack adjuster mechanism 40 is provided by the blind-hole 70. By assembling the internal slack adjuster components as a sub-assembly that is inserted into the blind-hole 70, overall packaging size is reduced. The compact sub-assembly of internal components, i.e. actuator disc 60, control disc 62, spring 90, bushing 64, and end cover 66, allow for a very short worm shaft 52 and a narrower housing 44. Further, by using a blind-hole as opposed to having a central hole open at both ends, a potential leak path is eliminated. This is critical due to the location of the slack adjuster in relation to the vehicle tires which spray water and road debris onto the slack adjuster. Finally, the blind-hole configuration offers a design where all machining can be accomplished from one direction. All the internal components are loaded in the same direction, which simplifies assembly and shortens the time for manufacturing purposes. Application Ser. No. 13/422,253, directed to the blind hole configuration, is filed on an even date herewith and is assigned to the assignee of the present application.

The cam operated brake is shown merely as an example, it should be understood that other brake configurations could also be used with the subject slack adjuster. Further, although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A slack adjuster comprising:
a worm shaft configured to drive a worm gear adapted to be coupled to a camshaft;
an adjustment assembly receiving slack adjustment input from a push rod, said adjustment assembly configured to automatically rotate said worm shaft when brake slack exceeds a predetermined limit; and
a manual adjuster moveable between a non-adjustment position where said manual adjuster is de-coupled from said worm shaft and a manual adjustment position where said manual adjuster is coupled to said worm shaft such that a position of said worm shaft can be manually adjusted, wherein said manual adjuster is moveable towards the worm shaft along an axial path defined by a longitudinal axis of the worm shaft from said non-adjustment position to said manual adjustment position;
wherein said worm shaft and adjustment assembly are mounted within a blind-bore formed within a housing, and wherein said manual adjuster comprises an end cover that is positioned within said blind-bore to cover an open end of said blind-bore; and
wherein said end cover comprises a hub portion facing said worm shaft and an extension portion that extends outwardly of the housing that encloses said worm shaft, and wherein said hub portion defines an internal bore having a splined surface configured to be coupled to a splined end of said worm shaft when said end cover is moved into said manual adjustment position.

2. The slack adjuster according to claim 1 wherein said adjustment assembly comprises a control disc that is fixed for rotation with said worm shaft and an actuator disc that is coupled to the push rod.

3. The slack adjuster according to claim 2 wherein said control disc includes a plurality of control teeth and said actuator disc includes a plurality of actuator teeth that are in engagement with said control teeth, and wherein during a brake apply stroke the push rod rotates said actuator disc such that said actuator teeth skip over said control teeth when slack exceeds said predetermined limit, and wherein slack adjustment is automatically provided on a brake return stroke as said actuator teeth drive said control teeth causing said worm shaft to rotate.

4. The slack adjuster according to claim 3 including a resilient member that biases said control teeth and said actuator teeth into engagement with each other.

5. The slack adjuster according to claim 4 wherein said end cover is moveable to said manual adjustment position by disengaging said control teeth from said actuator teeth by overcoming a biasing force of said resilient member.

6. The slack adjuster according to claim 5 wherein coupling of said end cover to said worm shaft and disengagement of said control and actuator discs occurs simultaneously.

7. The slack adjuster according to claim 1 wherein said end cover is freely rotatable in opposed directions within said blind-bore when in said non-adjustment position.

8. The slack adjuster according to claim 7 including a seal in sealing engagement with said end cover and a surface of said blind-bore, said seal being configured to retain said end cover within said blind-bore.

9. The slack adjuster according to claim 1 wherein said manual adjuster disengages automatic slack adjustment provided by said adjustment assembly when moving to said manual adjustment position.

10. The slack adjuster according to claim 1 wherein the hub portion has an outer surface with a smaller diameter than an inner diameter of a center bore of an actuator disc of the adjustment assembly such that the hub portion is inserted through the center bore without contacting the actuator disc when the manual adjuster is in the manual adjustment position.

11. The slack adjuster according to claim 1 wherein an end face of the hub portion faces the worm shaft and abuts a control disc of the adjustment assembly.

12. The slack adjuster according to claim 1 wherein the hub portion is spaced apart from the splined end of the worm shaft along the longitudinal axis of the worm shaft in the non-adjustment position; and wherein the splined surface of the hub portion is engaged with the splined end of the worm shaft for rotation therewith in the manual adjustment position.

13. A method of manually adjusting an automatic slack adjuster comprising the steps of:

providing a worm shaft configured to drive a worm gear adapted to be coupled to a camshaft;

forming a blind-bore within a housing;

mounting the worm shaft and an adjustment assembly within the blind-bore, the adjustment assembly automatically rotating said worm shaft when brake slack exceeds a predetermined limit;

moving a manual adjuster towards the worm shaft along a longitudinal axis of the worm shaft from a non-adjustment position where the manual adjuster is de-coupled from the worm shaft to a manual adjustment position where the manual adjuster is coupled to the worm shaft by pressing on the manual adjuster, the manual adjuster comprising an end cover positioned within the blind-bore and covering an open end of the blind-bore, the end cover comprising a hub portion facing the worm shaft and an extension portion extending outwardly of the housing enclosing the worm shaft, wherein said hub portion defines an internal bore having a splined surface, wherein moving the manual adjuster to the manual adjustment position includes coupling the splined surface of the hub portion to a splined end of said worm shaft; and selectively and manually adjusting a position of said worm shaft by rotating the manual adjuster.

14. The method according to claim 13 including providing slack adjustment input to the adjustment assembly configured to automatically rotate the worm shaft when brake slack exceeds the predetermined limit during a braking operation, and disengaging automatic slack adjustment provided by the adjustment assembly when moving the manual adjuster to the manual adjustment position.

15. The method according to claim 14 wherein the step of disengaging automatic slack adjustment and the step of coupling the manual adjuster to the worm shaft occur simultaneously.

16. The method according to claim 13 wherein the adjustment assembly comprises a control disc and an actuator disc, and including the steps of fixing the control disc for rotation with the worm shaft, coupling the actuator disc to a push rod that receives slack adjustment input, and resiliently biasing a plurality of control teeth on the control disc into engagement with a plurality of actuator teeth on the actuator disc.

17. The method according to claim 16 including disengaging the control teeth from the actuator teeth by overcoming a biasing force of a resilient member as the end cover is moved to the manual adjustment position.

* * * * *